March 25, 1947.  C. E. TACK ET AL  2,418,057
CLASP BRAKE
Filed Sept. 6, 1943  3 Sheets-Sheet 1

INVENTORS.
Carl E. Tack
and Wesley A. Helsten

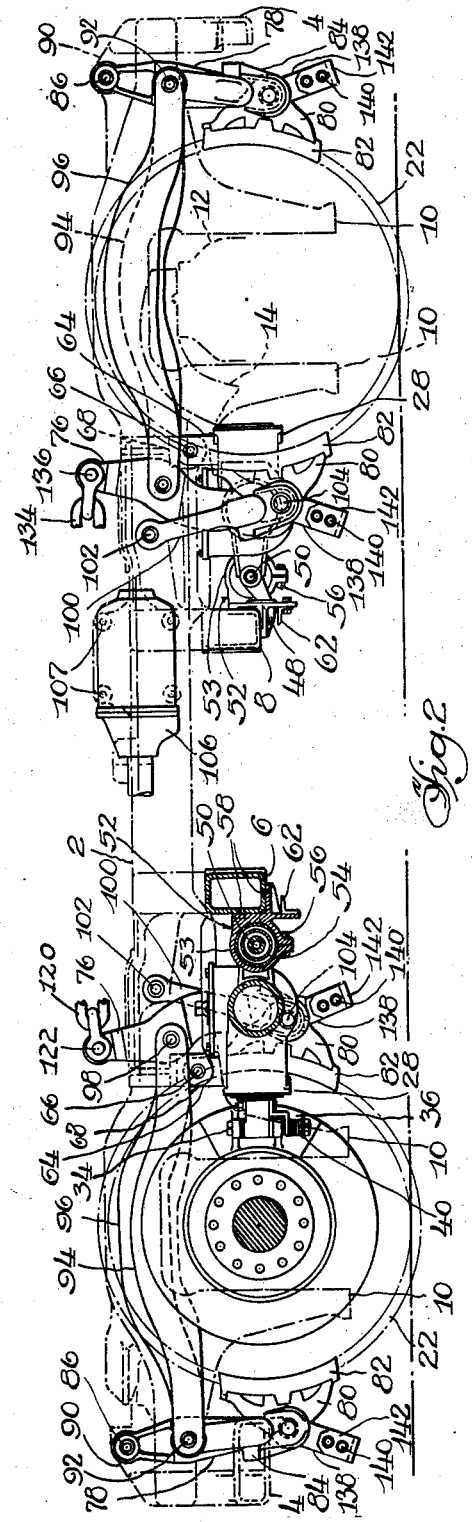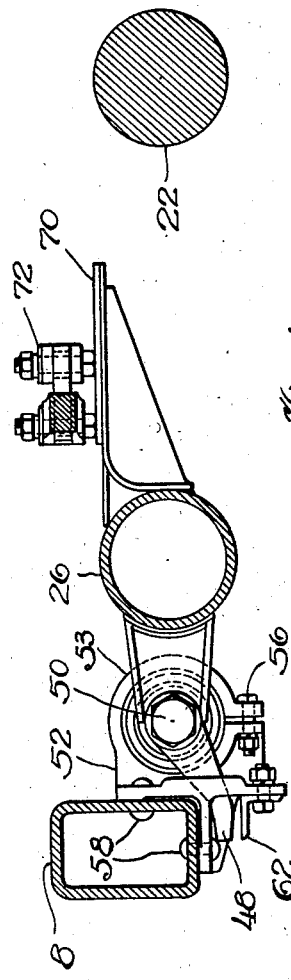

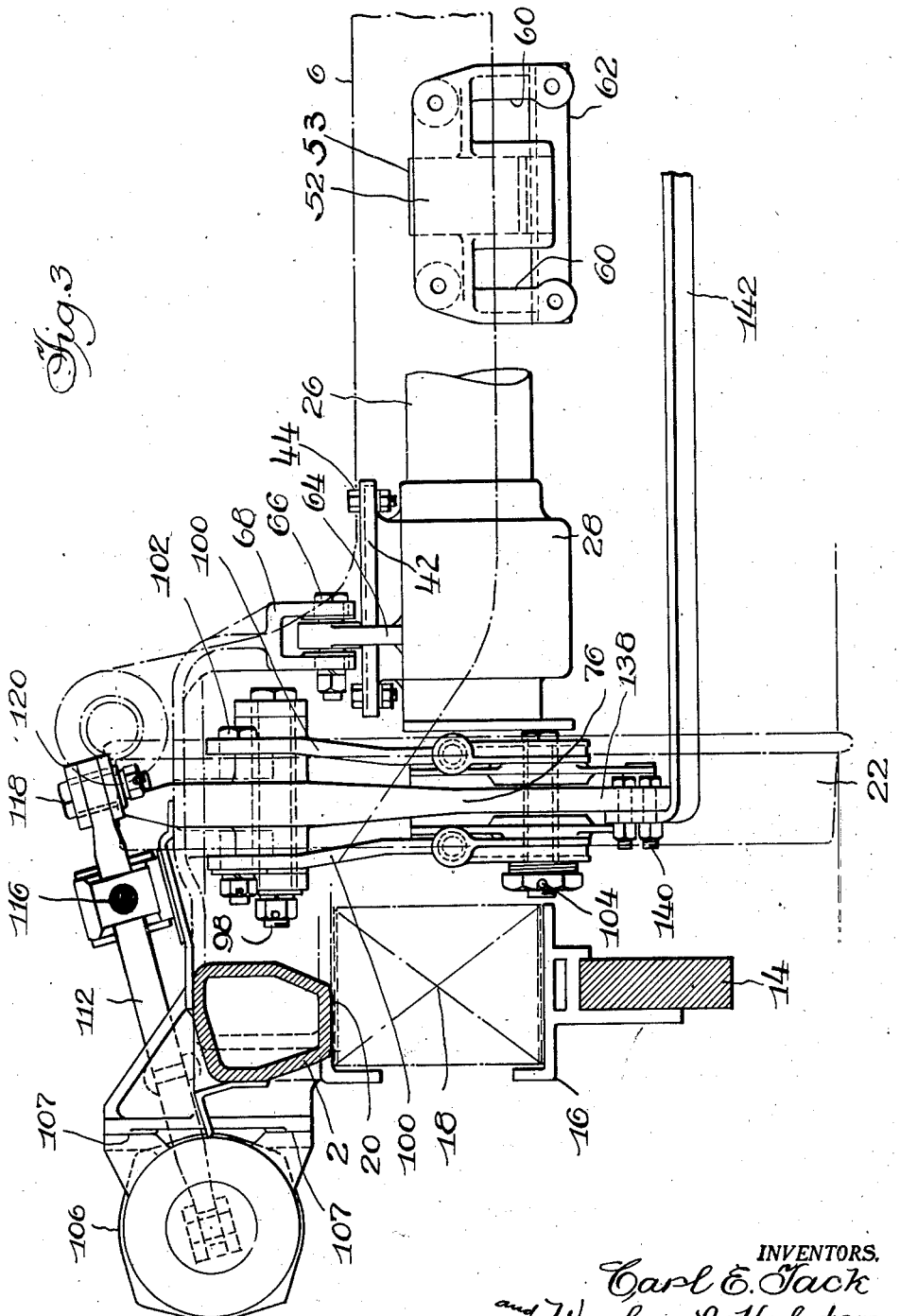

Patented Mar. 25, 1947

2,418,057

UNITED STATES PATENT OFFICE 2,418,057

CLASP BRAKE

Carl E. Tack and Wesley A. Helsten, Chicago, Ill., assignors to American Steel Foundries, Chicago, Ill., a corporation of New Jersey Application September 6, 1943, Serial No. 501,362

22 Claims. (Cl. 188—59)

Our invention relates to brakes and more particularly to a brake arrangement for a railway car truck.

The present invention comprehends a novel disc or rotor brake of the generic type disclosed in Tack patent application Serial No. 421,418, filed December 3, 1941, in the United States Patent Office, now Patent No. 2,355,120, issued August 8, 1944.

An object of this invention is to design a disc brake of the above type which may be utilized with a standard clasp brake arrangement in order to afford a combination of the two types of brakes. It will be understood that this combination is of considerable advantage in that a disc brake customarily uses composition to metal braking surfaces, whereas a clasp brake generally utilizes metal to metal braking surfaces and it has been found desirable to utilize both types of surfaces in order to effect a blending of the torque characteristics thereof.

A specific object of our invention is to design a disc brake arrangement in which the brake actuating mechanism is entirely suspended from the truck frame.

Our invention comprehends a brake frame of novel form comprising a beam extending transversely of the truck and formed at each end thereof with a cylinder housing, said beam being afforded a pivotal and resilient torque connection intermediate its ends to the adjacent truck frame transom, and each of said cylinder housings being afforded connection to a gusset bracket formed at the juncture of said transom with the adjacent side rail of the truck frame.

In the drawings:

Figure 2 is a side view of the structure shown in Figure 1, the right half thereof being a view in elevation and the left half thereof being a sectional view taken in the longitudinal vertical plane bisecting the truck as indicated by the line 2—2 of Figure 1.

Figure 1:
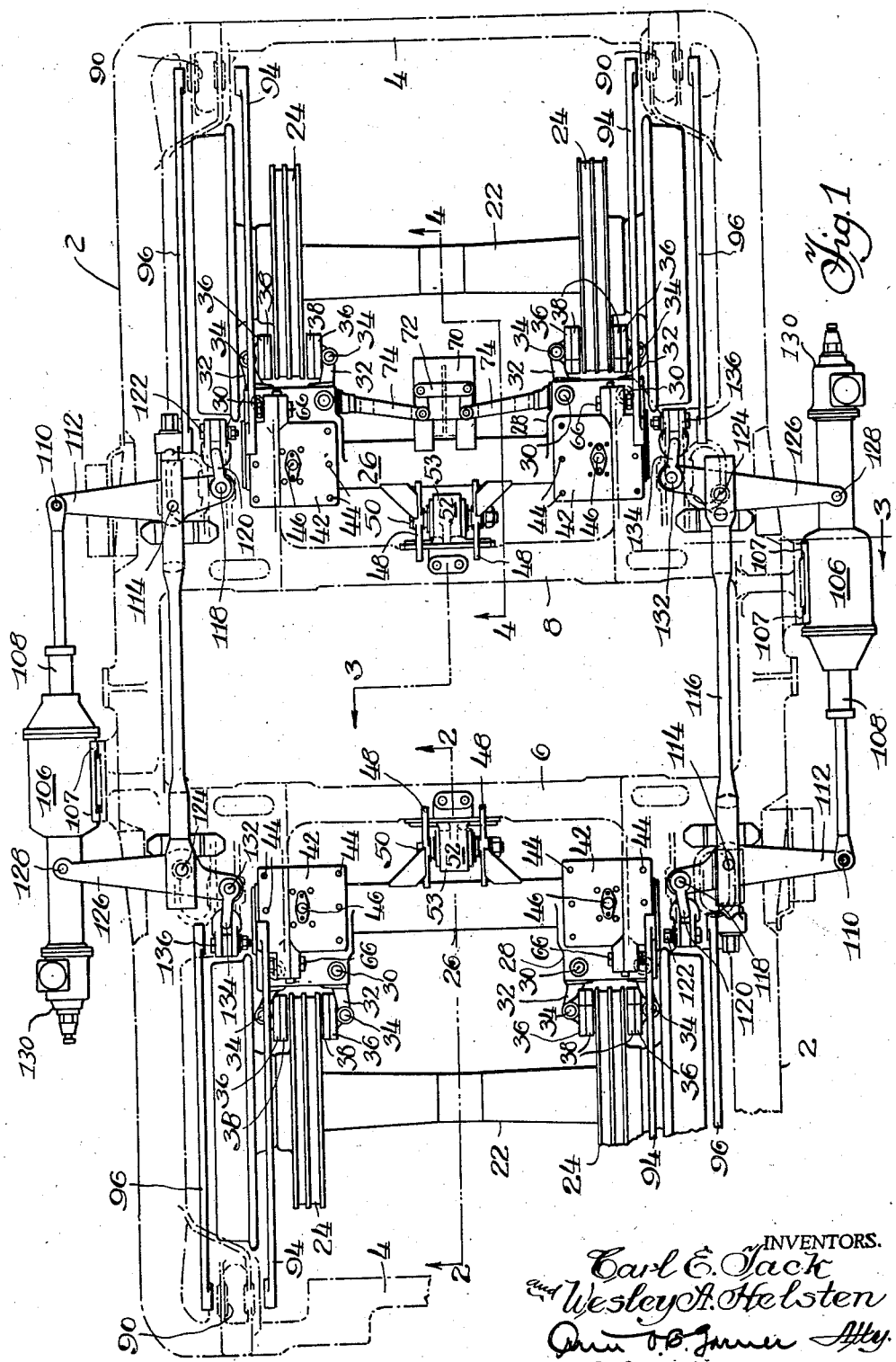
Figure 1 is a top plan view of a railway car truck embodying our invention with a portion of the truck broken away.

Figures 3 and 4 are sectional views taken respectively in the planes indicated by the lines 3—3 and 4—4 of Figure 1.

In each of the figures certain details may be omitted where they are more clearly seen in other views.

The truck frame comprises the spaced side rails 2, 2, the end rails 4, 4, and the spaced transoms 6 and 8 intermediate said end rails, said transoms being adapted for the support of a bolster member therebetween in conventional manner. At each end thereof each side rail 2 is provided with spaced pedestal legs or jaws 10, 10 for cooperation in usual manner with a journal box 12 (Figure 2, right). It will be understood that the journal boxes at each side of the truck afford support for a conventional equalizer 14 having adjacent each end thereof a spring seat 16 for the support of a spring group 18, seated as at 20 (Figure 3) against the adjacent side rail 2 in order to afford resilient support for the truck frame in the usual manner. The journal boxes 12, 12 are adapted for the reception of the journal ends of the wheel and axle assemblies 22, 22, each of said assemblies carrying adjacent each end thereof a brake disc or rotor 24 preferably formed as a steel or iron casting.

Disposed adjacent each wheel and axle assembly 22 and extending generally parallel thereto is a brake frame or beam 26 formed at each end thereof with a cylinder housing 28 affording pivotal fulcrums as at 30, 30 for brake levers 32, 32 pivotally connected as at 34, 34 to brake heads 36, 36, carrying brake shoes 38, 38 for frictional engagement with opposite sides of the adjacent disc 24. It will be understood that the shoes 38, 38 are preferably formed of composition material. Each brake head 36, as best seen in Figure 2, left, is provided with balancing means 40. The cylinder housing 28, as will be understood by those skilled in the art, contains a cylinder and associated pistons (not shown) for actuation of the levers 32, 32, the top of each housing being provided with a cover plate 42 secured thereto as at 44, 44 and provided with a nozzle or connection 46 by means of which actuating fluid is conveyed to the cylinder within the housing.

Each beam 26 intermediate its ends is provided with spaced arms 48, 48 pivotally connected by a pin 50 to a torque bracket 52 secured to the adjacent truck frame and transom as at 58, 58 (Figure 4), the connection at 50 being somewhat resilient by means of a composite resilient bushing 54 (Figure 2, left), said bushing being sleeved over the connecting pin or bolt 50 and comprising a plurality of metallic and resilient bushings sleeved one over the other, as more fully described in the above-mentioned co-pending application. As may be seen in Figure 2, left, the torque bracket 52 comprises a cylindrical portion 53, split along its lower edge. A bolt and nut assembly 56 is provided for clamping said cylindrical portion 53 around said bushing 54. The extremities of the arms 48, 48 project into slots 60, 60 (Figure 3), formed in the lower portion of the torque bracket 52, and a safety rod 62 is removably secured to the bracket at the lower extremity of said slots to afford support for the arms 48, 48 in the event that the connection at 50 should fail for some reason.

The beam 26 is afforded additional support at each end thereof by means of a lug 64 on the top of each cylinder housing 28, said lug being pivotally connected at 66 to a gusset bracket 68 formed at the juncture of the adjacent transom with the adjacent side rail 2 of the truck frame. Thus it will be seen that each brake beam 26 is afforded a three-point support from the truck frame and it will be noted that the connections at 66, 66 are disposed adjacent the forward ends of the cylinder housings 28, 28 to afford a stable support for the beam 26.

As more fully described in the above-mentioned application, when the beam is disconnected at 66, the extremities of the arms 48, 48 will bear against the torque bracket 52 at the upper margins of the slots 60, thus limiting rotative movement about the pin 50 and maintaining the beam in assembled relationship with the truck frame.

The beam 26, shown at the right in Figure 1, is provided with a support bracket 70 for hand brake actuating means 72 operatively connected to the hand brake levers 74, 74 projecting into the cylinder housings 28 for actuation of the levers 32, 32 as fully described in the above-mentioned application.

Clasp brake rigging is provided for each side of the truck, said rigging comprising live and dead truck levers 76 and 78 (Figure 2) at opposite sides of each wheel and each carrying a brake head 80 with a brake shoe 82 mounted thereon for engagement with the periphery of the wheel, each brake head being provided with balancing means 84 of well known form. Each dead lever is pivotally connected at its upper end as at 86 to a bracket 90 formed on the truck frame, and intermediate its ends said dead lever is pivotally connected as at 92 to the spaced inboard and outboard straps 94 and 96 extending above the adjacent axle for pivotal connection at 98 to the adjacent live truck lever 76 intermediate the ends thereof, said live lever being supported by means of hangers 100, 100 pivotally connected as at 102 to the truck frame and pivotally connected as at 104 to the associated brake head and the live truck lever 76.

An air cylinder device 106 is secured at 107, 107 to the side rail 2 and comprises the piston rod 108 which is pivotally connected at 110 to the live cylinder lever 112, which is pivotally connected intermediate its ends as at 114 to a pull rod 116, said lever 112 being pivotally connected at its inboard end as at 118 to clevis means 120 which is pivotally connected at 122 to the adjacent live truck lever 76. The opposite end of the pull rod 116 is pivotally connected at 124 to the dead cylinder lever 126 intermediate the ends thereof, the outboard end of said dead cylinder lever being pivotally connected at 128 to the automatic slack adjuster means 130 of conventional form. The inboard end of the dead cylinder lever 126 is pivotally connected at 132 to clevis means 134, which is pivotally connected at 136 to the upper end of the adjacent live truck lever 76.

It will be understood that in actuation of the clasp brake rigging, the piston rod 108 shown at the bottom of Figure 1 will move to the left as seen therein, causing clockwise movement of the live cylinder lever 112 about the pivot point 114, thus actuating the interconnected live and dead truck levers 76 and 78 at the left end of the truck. At the same time, the pull rod 116 moves to the left, causing a counterclockwise movement of the dead cylinder lever 126 about the pivot point 128, thus actuating the interconnected live and dead truck levers 76 and 78 at the right end of the truck.

Each of the truck levers 76 and 78 is provided with an extension 138 at the lower end thereof for connection at 140 to a tie bar 142 extending transversely of the truck and connected to the corresponding truck lever at the opposite side thereof, thus maintaining corresponding brake heads 80, 80 at opposite sides of the truck and their associated shoes in transverse alignment, as will be clearly understood by those skilled in the art.

Inasmuch as the brake shoes 82, 82 are preferably formed of iron for engagement with the periphery of the iron or steel wheels, whereas the brake shoes 38, 38 are preferably formed of composition for engagement with the brake discs 24, 24 formed of iron or steel, it will be understood that we obtain a blending of the torque characteristics of metal to metal and composition to metal braking materials. This is particularly desirable inasmuch as the co-efficient of friction between composition and metallic braking surfaces tends to diminish rapidly at low speeds, thus causing a "fade," whereas the co-efficient of friction of metallic braking materials tends to increase rapidly at low speeds, thus causing the shoes to seize or bind the wheels. By means of the combination of the two types of braking materials, we are enabled to obtain a relatively smooth torque curve as compared with that which would be obtained by the use of either the disc or the clasp brake mechanism alone.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rails intermediate said end rails, an equalizer mounted on the journal boxes at each side of the truck and affording a resilient support for said frame, a brake beam adjacent each assembly, cylinder housings formed on said beam at opposite ends thereof, a pivotal and resilient connection between said beam and the adjacent transom, a pivotal connection between the top of each housing and a gusset bracket formed at the juncture of said transom with the adjacent side rail, and friction means supported from each cylinder housing for braking cooperation with the adjacent disc, said first and second-mentioned connections being disposed at opposite sides of the longitudinal axis of said beam, said first-mentioned connection lying in a horizontal plane passing through said axles and said second-mentioned connection lying in a horizontal plane passing thereabove.

2. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rails intermediate said end rails, an equalizer mounted on the journal boxes at each side of the truck and affording a resilient support for said frame, a brake beam adjacent each assembly, cylinder housings formed on said beam at opposite ends thereof, a pivotal and resilient connection between said beam and the adjacent transom, a pivotal connection between the top of each housing and a gusset bracket formed at the juncture of said transom with the adjacent side rail, and friction means supported from each cylinder housing for braking cooperation with the adjacent disc, said friction means including spaced brake levers pivoted within each housing and carrying brake heads with friction shoes thereon for engagement with opposite sides of the associated disc.

3. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rails intermediate said end rails, an equalizer mounted on the journal boxes at each side of the truck and affording a resilient support for said frame, a brake beam adjacent each assembly, cylinder housings formed on said beam at opposite ends thereof, a pivotal and resilient connection between said beam and the adjacent transom, a pivotal connection between the top of each housing and a gusset bracket formed at the juncture of said transom with the adjacent side rail, and friction means supported from each cylinder housing for braking cooperation with the adjacent disc, said first-mentioned connection lying in a horizontal plane passing through the longitudinal axis of said beam and said axles, and said second-mentioned connection lying in a horizontal plane passing above said beam and said axles.

4. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rails intermediate said end rails, an equalizer mounted on the journal boxes at each side of the truck and affording a resilient support for said frame, a brake beam adjacent each assembly, cylinder housings formed on said beam at opposite ends thereof, a pivotal and resilient connection between said beam and the adjacent transom, a pivotal connection between the top of each housing and a gusset bracket formed at the juncture of said transom with the adjacent side rail, and friction means supported from each cylinder housing for braking cooperation with the adjacent disc, said first and second-mentioned connections being disposed at opposite sides of the longitudinal axis of said beam.

5. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rails intermediate said end rails, an equalizer mounted on the journal boxes at each side of the truck and affording a resilient support for said frame, a brake beam adjacent each assembly, cylinder housings formed on said beam at opposite ends thereof, a pivotal and resilient connection between said beam and the adjacent transom, a pivotal connection between the top of each housing and a gusset bracket formed at the juncture of said transom with the adjacent side rail, and friction means supported from each cylinder housing for braking cooperation with the adjacent disc, said last-mentioned connections being disposed adjacent the forward ends of said housings.

6. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rails intermediate said end rails, pedestal jaws on each side rail adjacent the ends thereof and cooperating with the adjacent journal boxes, an equalizer mounted on the journal boxes at each side of the truck and affording a resilient support for said frame, a brake beam adjacent each assembly, cylinder housings formed on said beam at opposite ends thereof, a pivotal and resilient connection between said beam and the adjacent transom, a pivotal connection between each housing and a gusset bracket formed at the juncture of said transom with the adjacent side rail, and friction means supported from each cylinder housing for braking cooperation with the adjacent disc.

7. In a brake arrangement for a railway car truck, spaced wheel and axle assemblies each including an axle with wheels thereon and discs driven by said axle adjacent respective wheels, journal boxes associated with the ends of said assemblies, a truck frame having spaced side rails, spaced end rails, and spaced transoms joining said side rail intermediate said end rails, an equalizer mounted on the journal boxes at each side of the truck and affording a resilient support for said frame, a brake beam adjacent each asembly, cylinder housings formed on said beam at opposite ends thereof, a pivotal and resilient connection between said beam and the adjacent transom, a pivotal connection between the top of each housing and a gusset bracket formed at the juncture of said transom with the adjacent side rail, and friction means supported from each cylinder housing for braking cooperation with the adjacent disc.

8. In a brake arrangement for a vehicle comprising a frame and spaced supporting wheel and axle assemblies, each including an axle and a member rotatable therewith, brake means for at least one of said assemblies comprising a support member extending generally parallel to the axle thereof, friction means carried by said support member for engagement with the associated rotatable member, a pivotal and resilient connection between said support member and a transversely extending portion of said frame, a pivotal conection between the top of said support member and an adjacent portion of said frame, said first and second-mentioned connections being disposed at opposite sides of the longitudinal axis of said support member, said first-mentioned connection being disposed in a horizontal plane passing through said support member and the associated axle and said second-mentioned connection being disposed in a horizontal plane extending above said axle and in a vertical plane extending transversely of said frame and between the axles of respective assemblies.

9. In a brake arrangement for a vehicle comprising a frame and spaced supporting wheel and axle assemblies each comprising an axle and a member rotatable therewith; brake means for at least one of said assemblies comprising a support member extending generally parallel to the axle thereof, brake apparatus carried by said support member and comprising a brake lever pivoted thereto and friction means carried by said lever and engageable with the associated rotatable member, and means for supporting said support member from said frame comprising a pivotal and resilient connection between said support member and a transversely extending portion of said frame and a plurality of spaced connections between said support member and adjacent portions of said frame, certain of said connections being disposed in a vertical plane extending longitudinally of the frame and passing through said associated rotatable member and in a vertical plane extending transversely of the frame between the axles of said assemblies, and another of said connections being disposed in a vertical plane substantially parallel to the first-mentioned plane and substantially bisecting said frame longitudinally thereof, said first and second-mentioned connections being disposed at opposite sides of the longitudinal axis of said support member.

10. In a brake arrangement for a railway car truck, a truck frame, spaced supporting wheel and axle assemblies, each including an axle and a member rotatable therewith, a brake beam extending transversely of the truck adjacent each asembly, a cylinder housing formed on said beam, a pivotal connection between said beam and a transversely extending portion of said frame, a connection between the top of said housing and said frame, and friction means supported from said housing for braking engagement with the associated of said members, said first and second-mentioned conections being disposed at opposite sides of the longitudinal axis of said beam, said first-mentioned connection lying in a horizontal plane passing through said axle and said second-mentioned connection lying in a horizontal plane passing thereabove.

11. In a brake arrangement for a railway car truck, a truck frame, spaced supporting wheel and axle assemblies, each including an axle and a member rotatable therewith, a brake beam extending transversely of the truck adjacent each assembly, a cylinder housing formed on said beam, a pivotal connection between said beam and a transversely extending portion of said frame, a connection between the top of said housing and said frame, and friction means supported from said housing for braking engagement with the associated of said members, said last-mentioned connection being disposed at the end of said housing adjacent the associated of said members.

12. In a brake arrangement for a railway car truck, a truck frame, spaced supporting wheel and axle assemblies, each including an axle and a member rotatable therewith, a brake beam extending transversely of the truck adjacent each assembly, a cylinder housing formed on said beam, a pivotal connection between said beam and a transversely extending portion of said frame, a connection between the top of said housing and said frame, and friction means supported from said housing for braking engagement with the associated of said members.

13. In a brake beam for a railway car truck, an elongated member with a cylinder housing at each end thereof, means intermediate the ends of said member for connection to an associated truck frame, and means on the top of each housing for connection to said frame, said first and second-mentioned means being disposed at opposite sides of the longitudinal axis of said member, said first-mentioned means being disposed in a horizontal plane passing through said axis and said second-mentioned means being disposed in a horizontal plane extending above said member.

14. In a brake beam for a railway car truck, an elongated member with a cylinder housing on at least one end thereof, said member having means spaced from said housing for attaching said beam to an associated truck frame, and means on the top of said housing for attaching said beam to said frame.

15. In a brake arrangement for a railway car truck comprising a truck frame and a supporting wheel and axle assembly including an axle and a brake disc, the combination of a brake beam extending transversely of said frame, a cylinder housing on said beam, a torque connection between said beam and a transversely extending portion of said frame, a connection between the top of said housing and said frame, and brake means carried by said housing for braking opposite sides of said disc.

16. In a brake beam for a railway car truck, an elongated member with a cylinder housing on at least one end thereof, means on said member spaced from said housing and adapted for connection to an associated truck frame, and means on the top of said housing for connection to said frame, said first and second-mentioned means being disposed at opposite sides of the longitudinal axis of said member.

17. In a brake beam for a railway car truck, an elongated member with a cylinder housing at each end thereof, means intermediate the ends of said member for connection to an associated truck frame, and means on the top of each housing for connection to said frame, said first and second-mentioned means being disposed at opposite sides of the longitudinal axis of said member.

18. In a brake beam for a railway car truck, an elongated member with a cylinder housing at each end thereof, means intermediate the ends of said member for connection to an associated truck frame, and means on the top of each housing for connection to said frame.

19. In a brake arrangement for a railway car truck comprising a truck frame and a supporting wheel and axle assembly including an axle, spaced wheels, and a brake rotor adjacent each wheel, the combination of a brake support member extending transversely of said frame, said member having its ends disposed inboardly of respective wheels, a cylinder housing on said member at each end thereof, a connection between the top of each housing and said frame, a torque connection between said frame and said member intermediate the ends of the latter, and brake means carried by each housing for decelerating rotation of the adjacent rotor.

20. In a brake arrangement for a railway car truck comprising a truck frame and a supporting wheel and axle assembly including an axle, spaced wheels, and a brake rotor adjacent each wheel, the combination of a brake support member extending transversely of said frame, said member having its ends disposed inboardly of respective wheels, a cylinder housing on said member at each end thereof, a pivotal connection between the top of each housing and said frame at one side of the longitudinal axis of said member, a pivotal and resilient torque connection between said frame and said member intermediate the ends of the latter and disposed at the opposite side of said axis, and friction means carried by each housing comprising brake shoes at opposite sides of the adjacent disc for braking engagement therewith.

21. In a brake arrangement for a railway car truck comprising a truck frame and a supporting wheel and axle assembly including an axle, spaced wheels, and a brake rotor adjacent each wheel, the combination of a brake support member extending transversely of said frame, said member having its ends disposed inboardly of respective wheels, a cylinder housing on said member at each end thereof, a pivotal connection between the top of each housing and said frame at one side of the longitudinal axis of said member, a pivotal and resilient torque connection between said frame and said member intermediate the ends of the latter and disposed at the opposite side of said axis, friction means carried by each housing comprising brake shoes at opposite sides of the adjacent disc for braking engagement therewith, and brake means for each wheel disposed outboardly of the adjacent end of said support member.

22. In a brake arrangement for a railway car truck comprising a truck frame and a supporting wheel and axle assembly including spaced wheels, an axle, and a brake rotor intermediate said wheels, the combination of a brake support member extending transversely of said frame, said member having its ends disposed inboardly of respective wheels, a cylinder housing on said member adjacent said rotor, and means connecting said member to said frame, said means comprising a connection between the frame and the top of said member adjacent each end thereof, and a connection between the frame and said member intermediate the ends thereof, and brake means carried by said housing for braking cooperation with said rotor.

CARL E. TACK.
WESLEY A. HELSTEN.

REFERENCES CITED

The following references are of record in the file of this patent:

UNITED STATES PATENTS

| Number | Name | Date |
| --- | --- | --- |
| 2,284,484 | Eksergian | May 26, 1942 |
| 2,236,898 | Eksergian | Apr. 1, 1941 |
| 2,251,668 | Eksergian | Aug. 5, 1941 |
| 2,276,337 | Pflager | Mar. 17, 1942 |
| 2,334,024 | Nystrom et al. | Nov. 9, 1943 |
| 1,998,976 | Baselt | Apr. 23, 1935 |
| 2,211,888 | Farmer | Aug. 20, 1940 |
| 2,228,818 | Eksergian | Jan. 14, 1941 |

FOREIGN PATENTS

| Number | Country | Date |
| --- | --- | --- |
| 485,143 | German | Nov. 27, 1929 |